(12) United States Patent
Kuperman

(10) Patent No.: US 11,754,127 B2
(45) Date of Patent: Sep. 12, 2023

(54) TWO-PIECE CLUTCH HUB WITH CENTRALLY LOCATED HUB PROVIDING ADDED STRENGTH AND STABILITY

(71) Applicant: RevMax Performance, LLC, Charlotte, NC (US)

(72) Inventor: Frank C. Kuperman, Waxhaw, NC (US)

(73) Assignee: REVMAX PERFORMANCE, LLC, Charlotte, NC (US)

( * ) Notice: Subject to any disclaimer, the term of this patent is extended or adjusted under 35 U.S.C. 154(b) by 0 days.

(21) Appl. No.: 17/946,309

(22) Filed: Sep. 16, 2022

(65) Prior Publication Data

US 2023/0081822 A1 Mar. 16, 2023

Related U.S. Application Data

(60) Provisional application No. 63/244,959, filed on Sep. 16, 2021.

(51) Int. Cl.
*F16D 13/60* (2006.01)

(52) U.S. Cl.
CPC .................................. *F16D 13/60* (2013.01)

(58) Field of Classification Search
CPC .. F16D 13/60; F16D 13/644; F16D 2200/003; F16D 13/72; F16D 13/74
See application file for complete search history.

(56) References Cited

U.S. PATENT DOCUMENTS 10,948,059 B2 * 3/2021 Hardin .................... F16D 13/58

* cited by examiner

*Primary Examiner* — Huan Le
(74) *Attorney, Agent, or Firm* — Seth L. Hudson; Maynard Nexsen PC

(57) ABSTRACT

The present invention provides methods and systems for a clutch hub that includes a plate with a top surface and a bottom surface that extends outwardly to an outer edge. An annular ring portion with an exterior surface extends upward from the top surface of the plate at a distance from the outer edge and forming an outer flange between the exterior surface and the outer edge. A plurality of splines disposed on the exterior surface of the annular ring portion.

20 Claims, 19 Drawing Sheets

US 11,754,127 B2

TWO-PIECE CLUTCH HUB WITH CENTRALLY LOCATED HUB PROVIDING ADDED STRENGTH AND STABILITY

CROSS-REFERENCE TO RELATED APPLICATION

The present patent application/patent claims the benefit of priority of U.S. Provisional Patent Application No. 63/244,959, filed on Sep. 16, 2021, and entitled "TWO-PIECE CLUTCH HUB WITH CENTRALLY LOCATED HUB PROVIDING ADDED STRENGTH AND STABILITY," the contents of which are incorporated in full by reference herein.

FIELD OF THE INVENTION

The present invention relates generally to a clutch hub and more generally relates to a two-piece clutch hub with a centrally located hub engaged to a plate for providing strength and stability and preventing flexing of the plate.

BRIEF SUMMARY OF THE INVENTION

According to an embodiment of the present invention, a clutch hub includes a plate with a top surface and a bottom surface that extends outward to an outer edge. An annular ring portion with an exterior surface extends upward from the top surface of the plate at a distance from the outer edge and forming a flange between the exterior surface and the outer edge. A plurality of splines disposed on the exterior surface of the annular ring portion.

According to another embodiment of the present invention, a central hub is centrally disposed within the plate.

According to yet another embodiment of the present invention, the central hub is composed of Aluminum.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
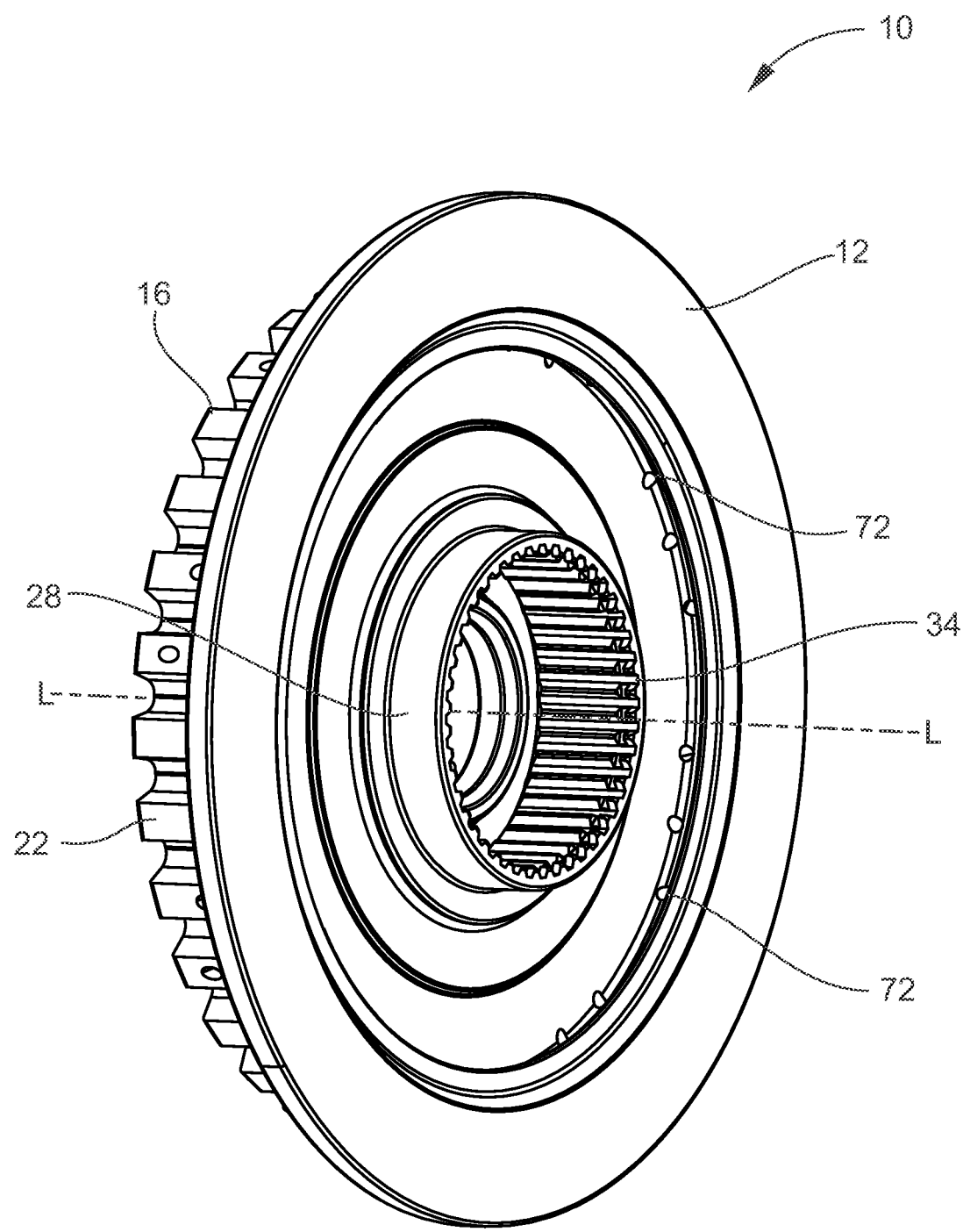
FIG. 1 is a perspective view of the clutch hub.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a clutch hub is illustrated in FIGS. 1-5 and shown generally at reference numeral 10. The clutch hub 10 comprises a plate 12 with a centrally disposed opening 14, an annular ring portion 16, and a central hub 18 separable from the plate 12.

Figure 4:
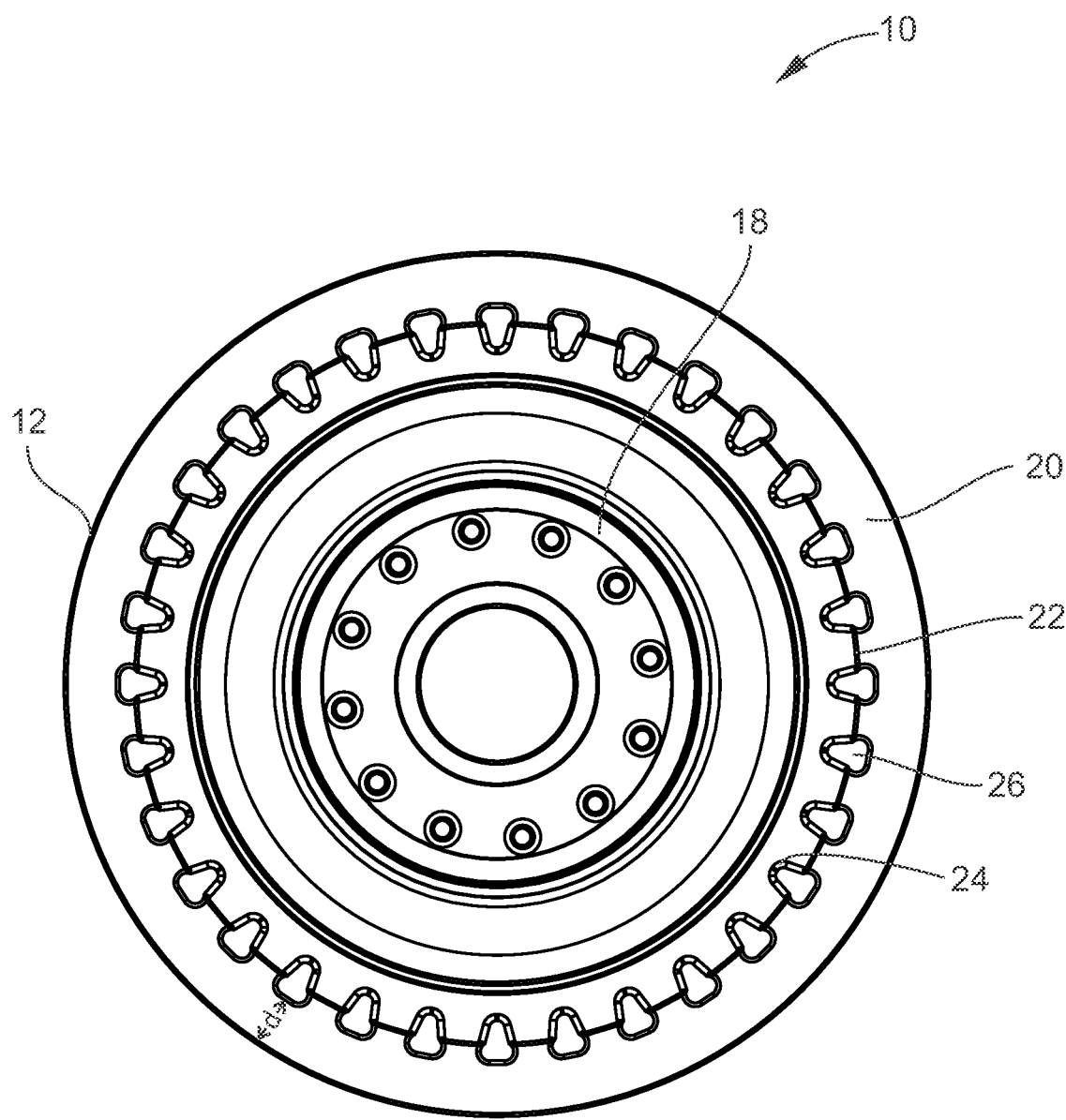
FIG. 4 is a top view of the clutch hub.
Figure 5:
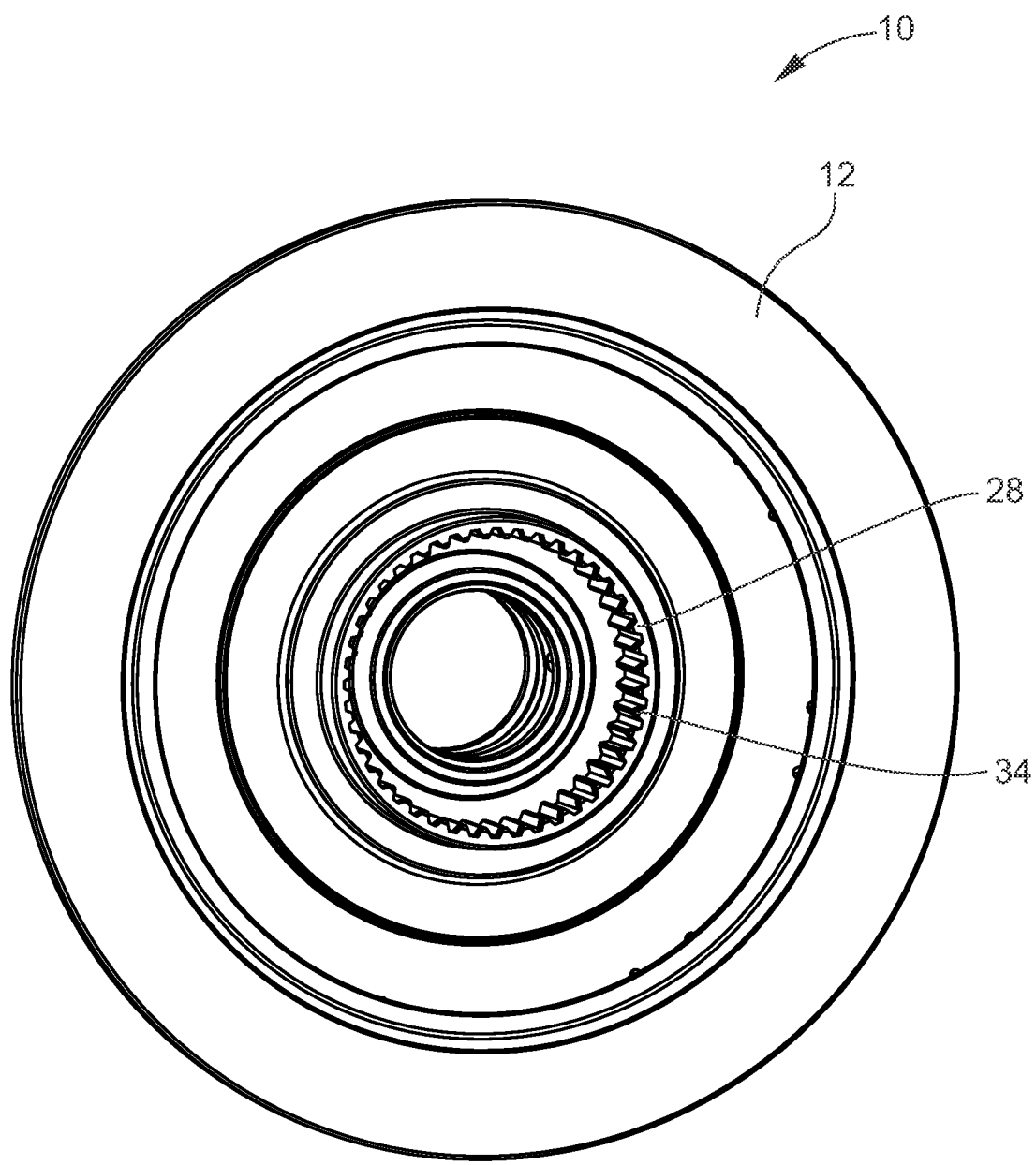
FIG. 5 is a bottom view of the clutch hub.

The plate 12 is circular in shape with a top surface and a bottom surface that extends outwardly to an outer edge. The centrally disposed opening 14 extends from the top surface to the bottom surface and defined by an inner edge of the plate 12. The opening 14 is circular and extends along the longitudinal axis L-L of the clutch hub 10. The annular ring portion 16 extends outwardly from the top surface of the plate 12 from a first end to a second end. The first end is engaged to the top surface of the plate 12 and the annular ring portion 16 extends upwardly to an upper edge on the second end. The annular ring portion 16 is engaged to the plate 12 at a point set back from the outer edge of the plate 12, forming an outer flange 20 between the back surface of the annular ring portion 16 and the outer edge of the plate 12. In other words, the annular ring portion 16 is disposed a distance "d" from the outer edge of the plate 12, creating an outer flange 20, as illustrated in FIGS. 1 and 4. The dimension of "d" is larger than a prior art OEM part and between about 0.1 inch (0.25 cm) to about 1 inch (2.54 cm), more preferably between about 0.3 inches (0.76 cm) to about 0.9 inches (2.28 cm), and most preferably 0.5 inches (1.27 cm) to 0.8 inches (2.03 cm) and as shown in the FIGS. 2 and 4 "d" is 0.68 inches (1.72 cm).

The outer flange 20, which is a portion of the plate 12 proximate the outer edge of the plate 12 and between the annular ring portion 16 and outer edge of the plate 12. The annular ring portion 16 contains a circular cross-section with a front surface facing the opening 14 and a back surface facing the outer edge of the plate 12. The front surface is smooth with no indentations, grooves, channels, or the like. The front surface may have a beveled edge proximate the second end of the annular ring portion 16. A plurality of radially outwardly extending splines 22 extend from the back surface. The splines 22 extend from the first end to the second end of the annular ring portion 16. The splines 22 are machined in the manufacturing process and since the splines 22 extend from the first end to the second end of the annular ring portion 16, they provide additional contact points and support, thus preventing flexing of the plate 12, during use. The splines 22 are spaced-apart around the entire periphery of back surface of the annular ring portion 16 and contain voids 24 between each spline 22. The voids 24 are disposed between each spline 22.

Figure 2:
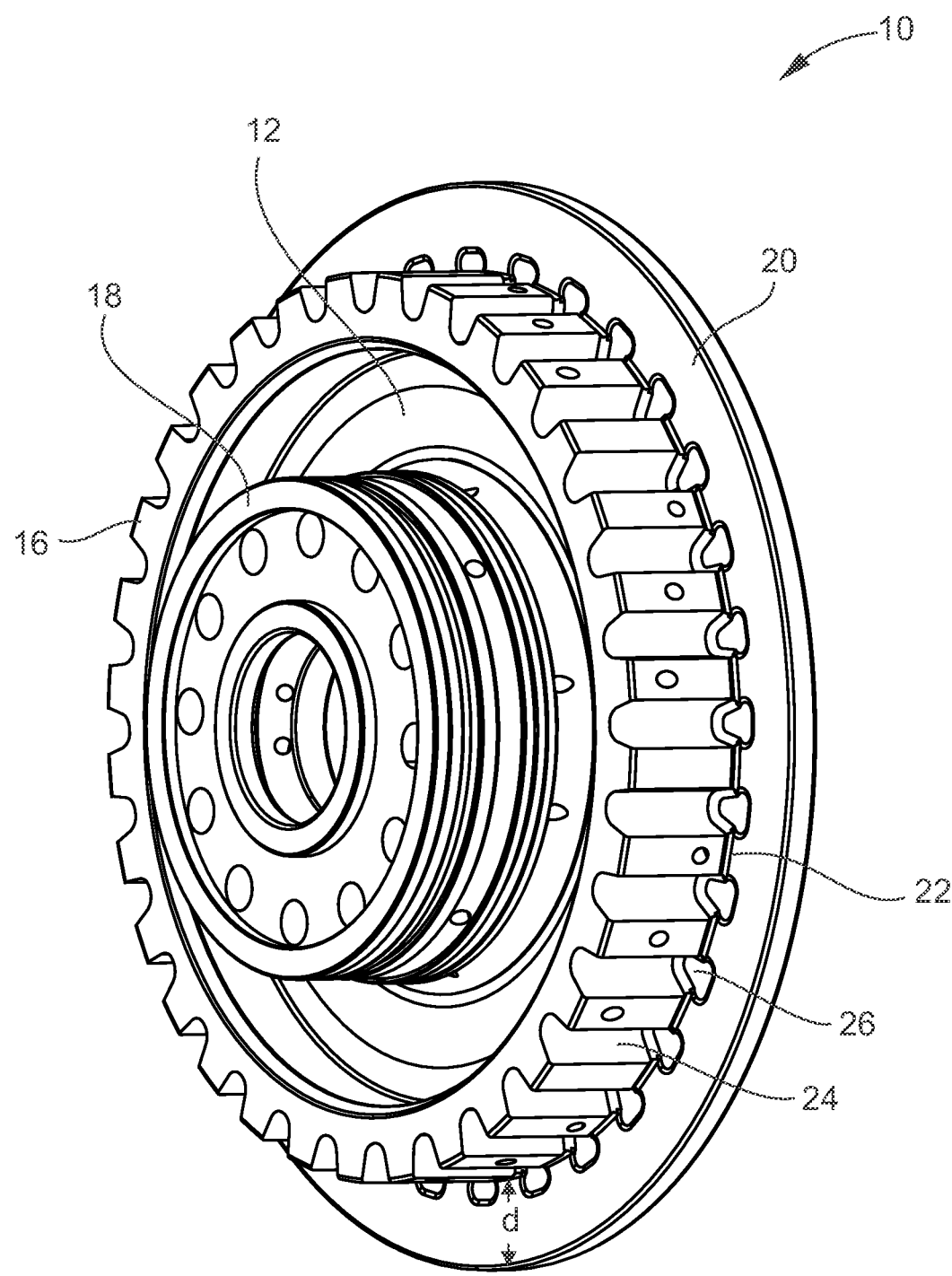
FIG. 2 is a perspective view of the clutch hub.
Figure 3:
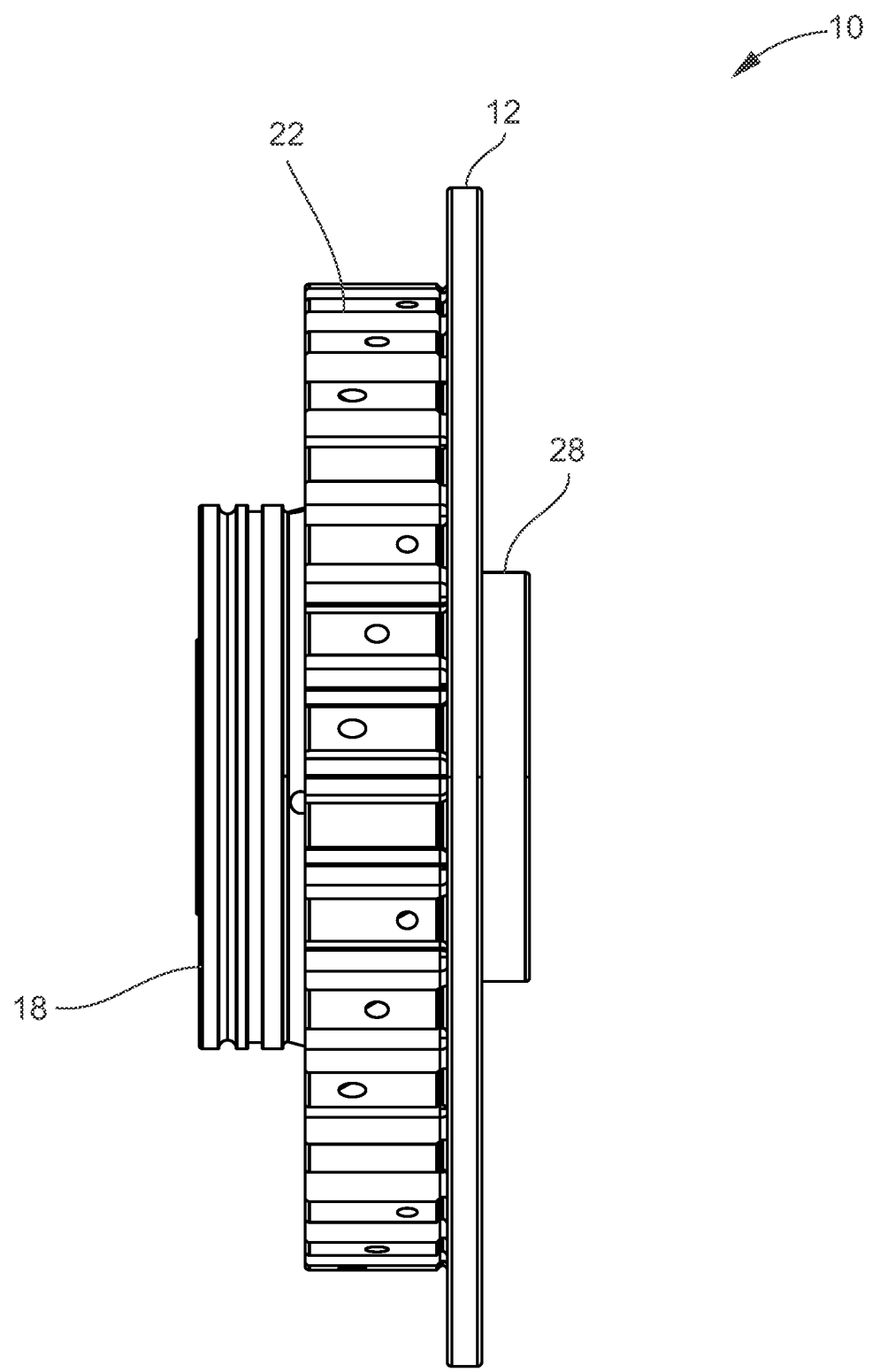
FIG. 3 is a side perspective view of the clutch hub.
Figure 8:
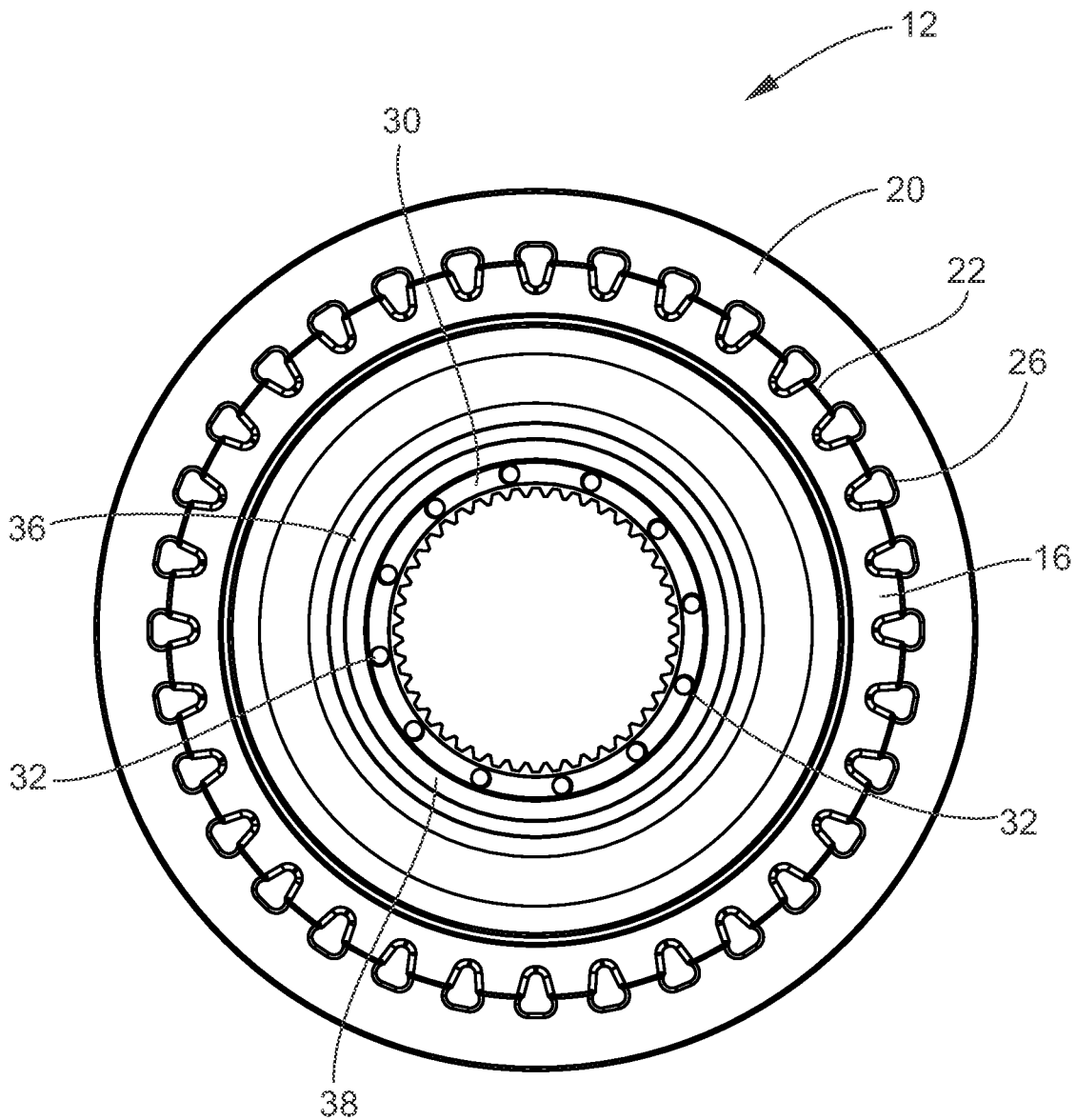
FIG. 8 is a top view of the plate.
Figure 9:
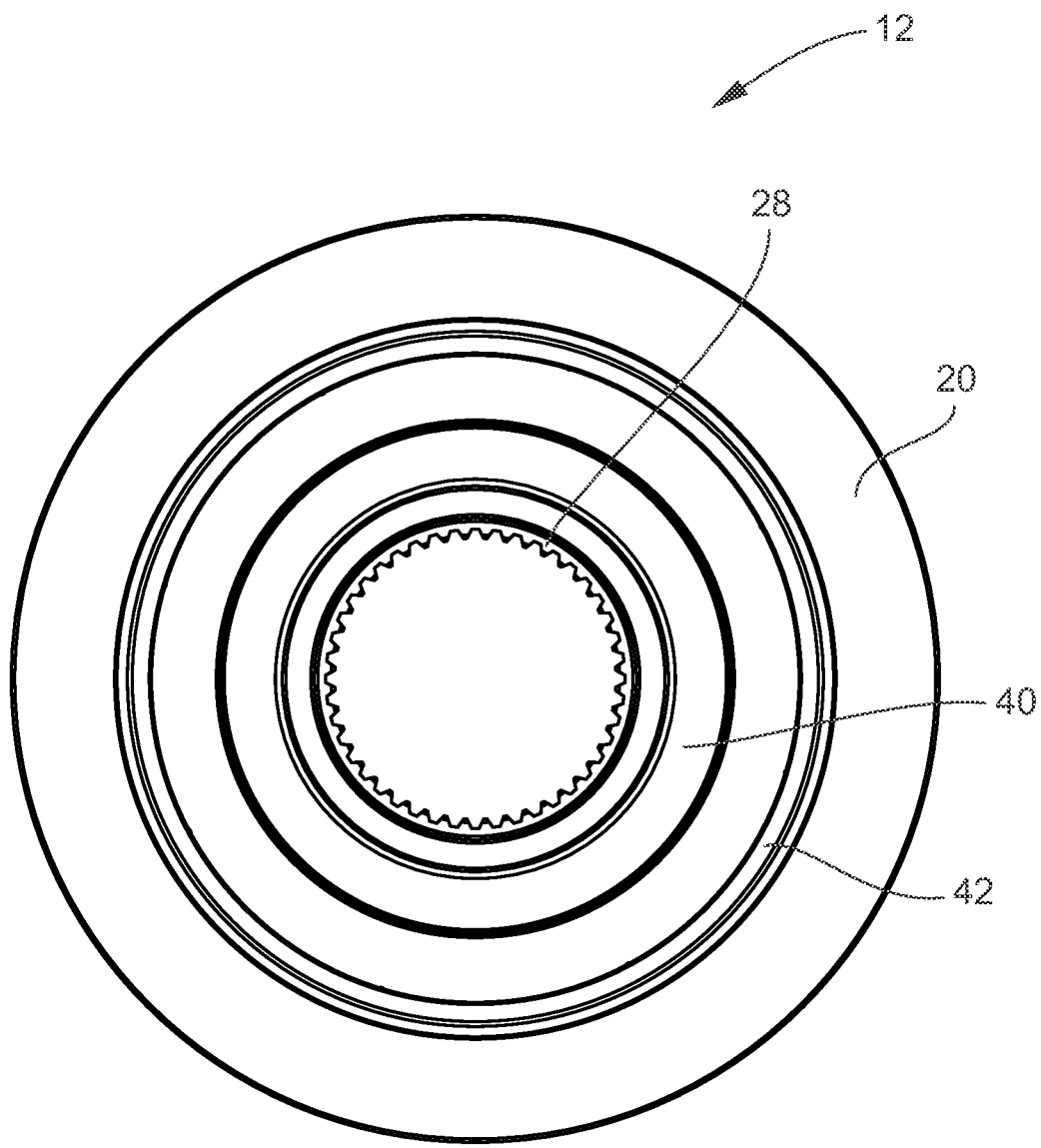
FIG. 9 is a bottom view of the plate.

A recessed contact point 26 is disposed between the splines 22. As illustrated in FIGS. 2 and 4, the contact point 26 is disposed within the top surface of the plate 12 proximate the void 24 between each spline 22 and extends outwardly towards the outer edge of the plate 12. The width of the contact point 26 gradually increases from a first end to a second end. The first end is proximate the back surface of the annular ring portion 16 within the void 24 between two adjacent splines 22 and extends to a second end, extending past the outer surface of the splines 22. As best seen in FIGS. 4 and 8, the contact point 26 has a "tear drop" shape when viewed from above.

Figure 6:
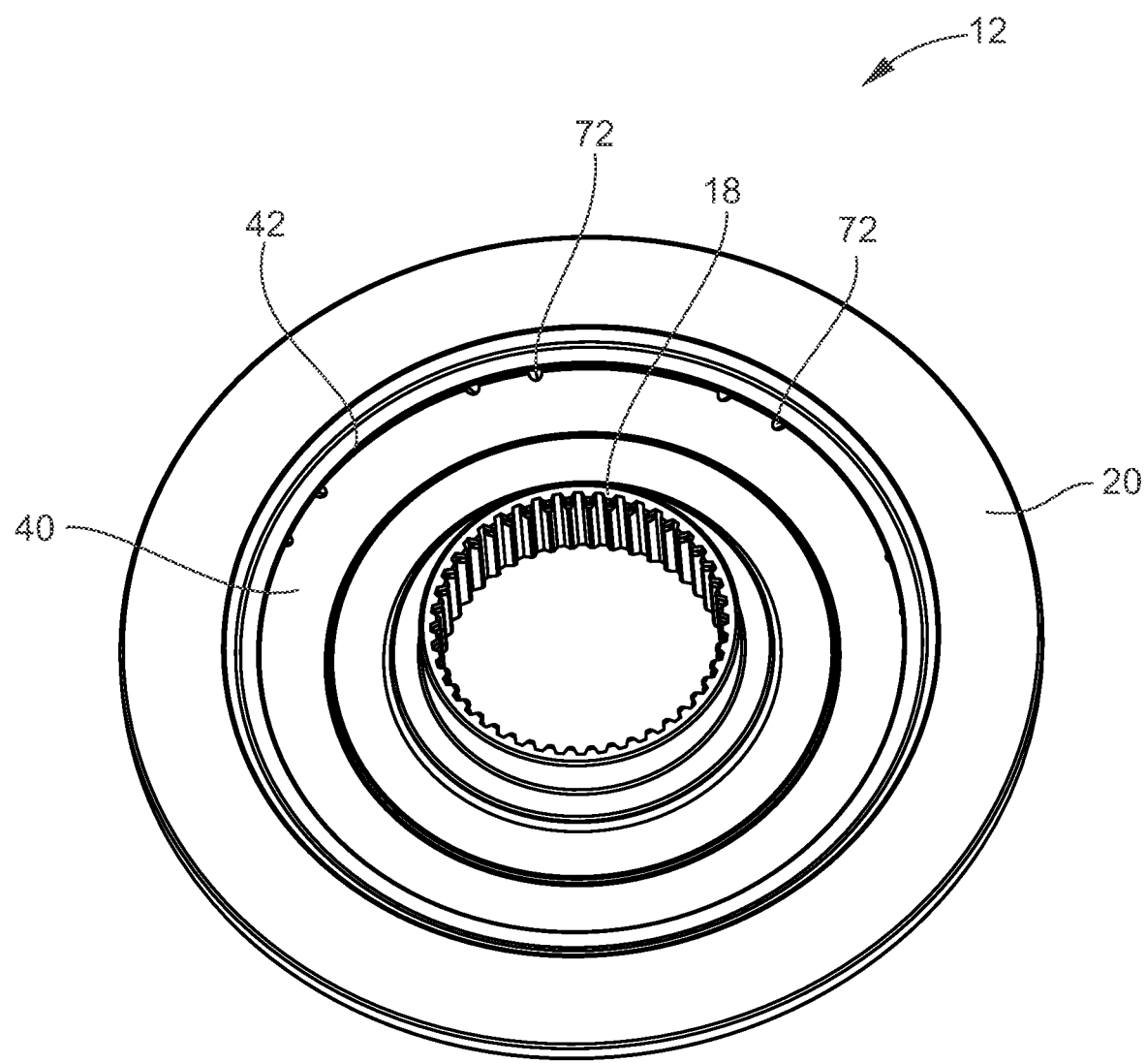
FIG. 6 is a perspective view of the plate.
Figure 7:
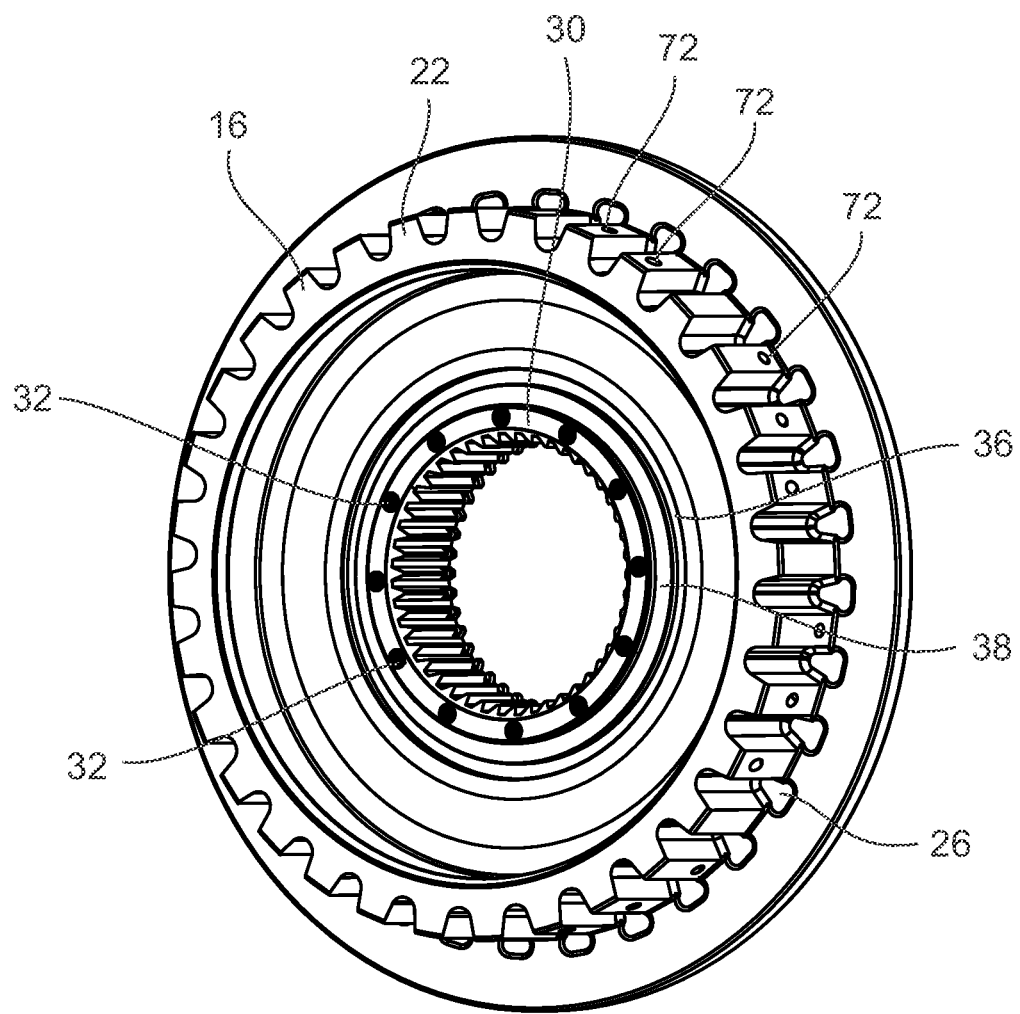
FIG. 7 is a perspective view of the plate.

The opening 14 contains a collar 28 extending longitudinally outwardly from the bottom surface of the plate 12 along the longitudinal axis L-L, as shown in FIG. 6 proximate the inner edge of the plate 12. The collar 28 extends outwardly from the bottom surface of the plate 12 but the distance in the longitudinal direction between the top surface of the plate 12 and the upper edge is less than the distance between the bottom surface of the plate and the upper edge of the opposed end of the collar 28. The upper edge of the collar 28 extending outwardly from top surface of the plate 12 contains a hub receiving portion 30. The hub receiving portion 30 surrounds the opening 14 and inner edge of the plate 12, containing a plurality of receiving holes 32. The receiving holes 32 are spaced apart along the hub receiving portion 30, and preferably spaced an equal distance apart along the hub receiving portion 30. The receiving holes 32 are designed to receive an engagement device, such as a bolt, screw, or the like for engaging the central hub 18 to the plate 12. The inner surface of the collar 28 contains a plurality of splines 34 extending radially inwardly. The length of each spline 34 is parallel to the longitudinal axis L-L, as shown in FIG. 7 and extends from one end of the collar 28 proximate the hub receiving portion 30 to the upper edge of the opposite end of the collar 28. The splines 34 extend proximate the hub receiving portion 30 proximate the top surface of the plate 12, through the opening 14, to an upper edge of the collar 28. The splines 34 extend along the entire inner surface of the collar 28 and spaced an equal distance apart with each spline 34 separated by a void. While the inner surface of the collar 28 contains a plurality of splines 34, the outer surface of the collar 28, extending from the bottom surface of the plate 12 to the upper edge is preferably smooth without any groves, channels, or other protrusions.

A circular channel 36 may be disposed on the top surface of the plate 12 proximate the hub receiving portion 30. The circular channel 36 is recessed below the surface of the hub receiving portion 30. A chamfered ring 38 is disposed within the circular channel 36, extending from the outer surface of the collar 28 proximate the hub receiving portion 30.

The bottom surface of the plate 12, as shown in FIG. 6, contains an annular depression 40 disposed between the collar 28 and the outer flange 20 of the plate 12. The outer flange 20 on the bottom surface of the plate 12 is opposite the outer flange 20 on the top surface of the plate 12 described above. The annular depression 40 is disposed below the planer surface of the outer flange 20 on the bottom surface of the plate 12. The transition between the annular depression 40 and the outer flange 20 results in a shoulder 42 that is annular and while spaced-apart by the annular depression 40, completely surrounds the opening 14, wherein the diameter of the opening 14 is smaller than the distance between opposed surfaces of the shoulder 42. The transition between the shoulder 42 and the outer flange 20 is tapered, resulting in a smooth and angled transition between the shoulder 42 and outer flange 20. The outer flange 20 of the bottom surface is the portion of the plate 12 extending from the shoulder 42 to the outer edge of the plate 12. Another transition is located at the intersection of the shoulder 42 and the annular depression 40.

Figure 10:
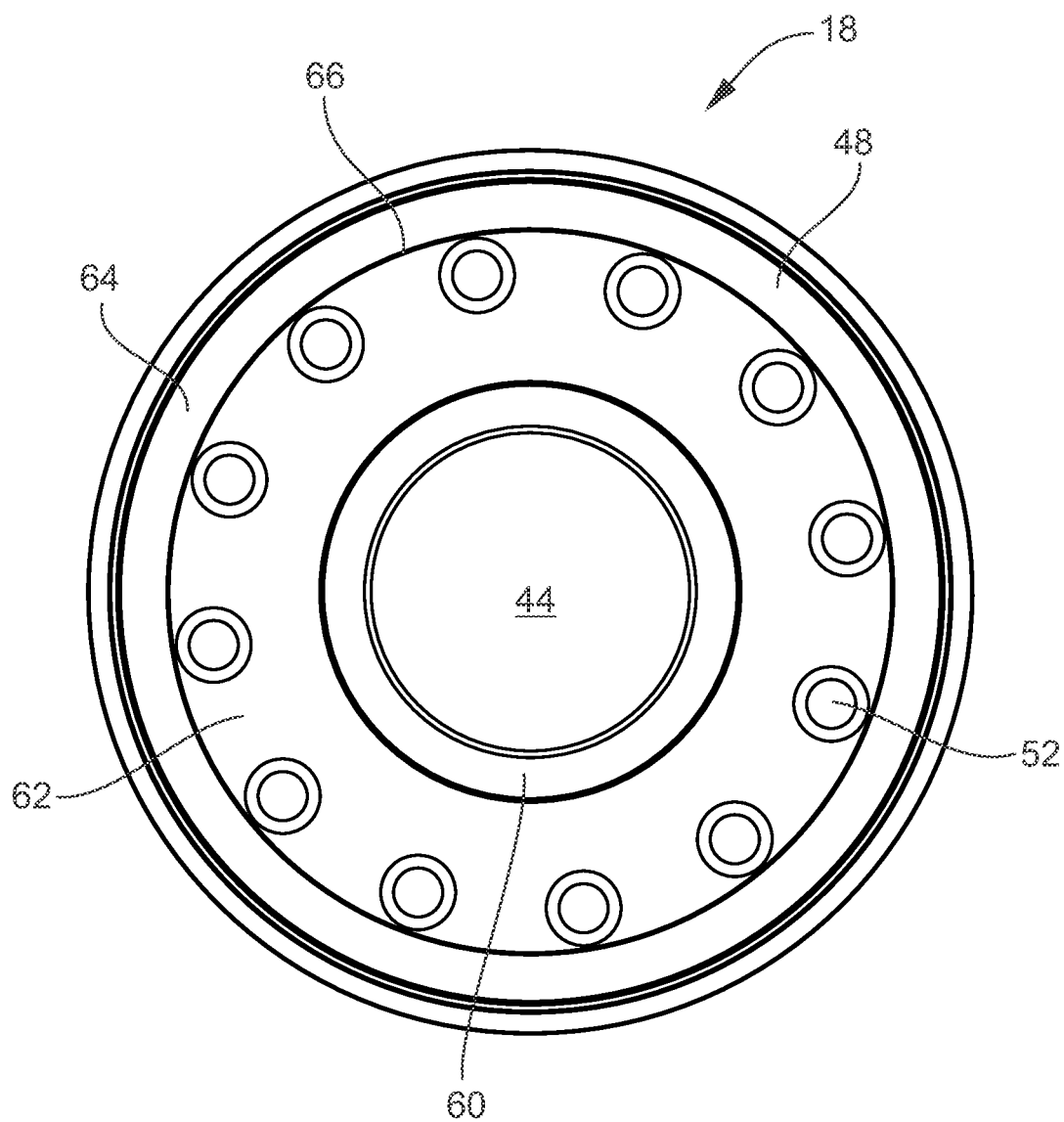
FIG. 10 is a top view of the central hub.
Figure 11:
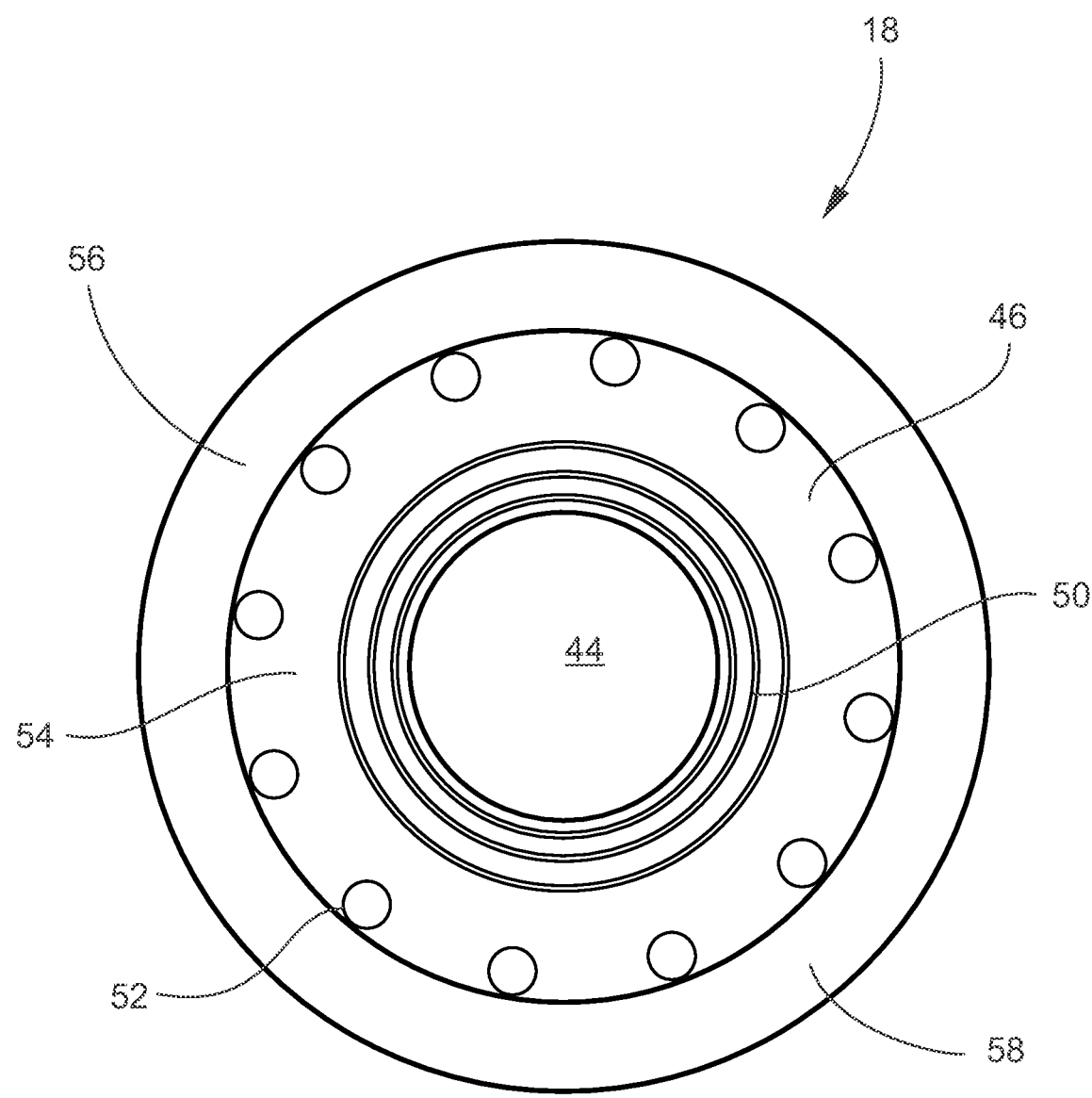
FIG. 11 is a bottom view of the central hub.
Figure 12:
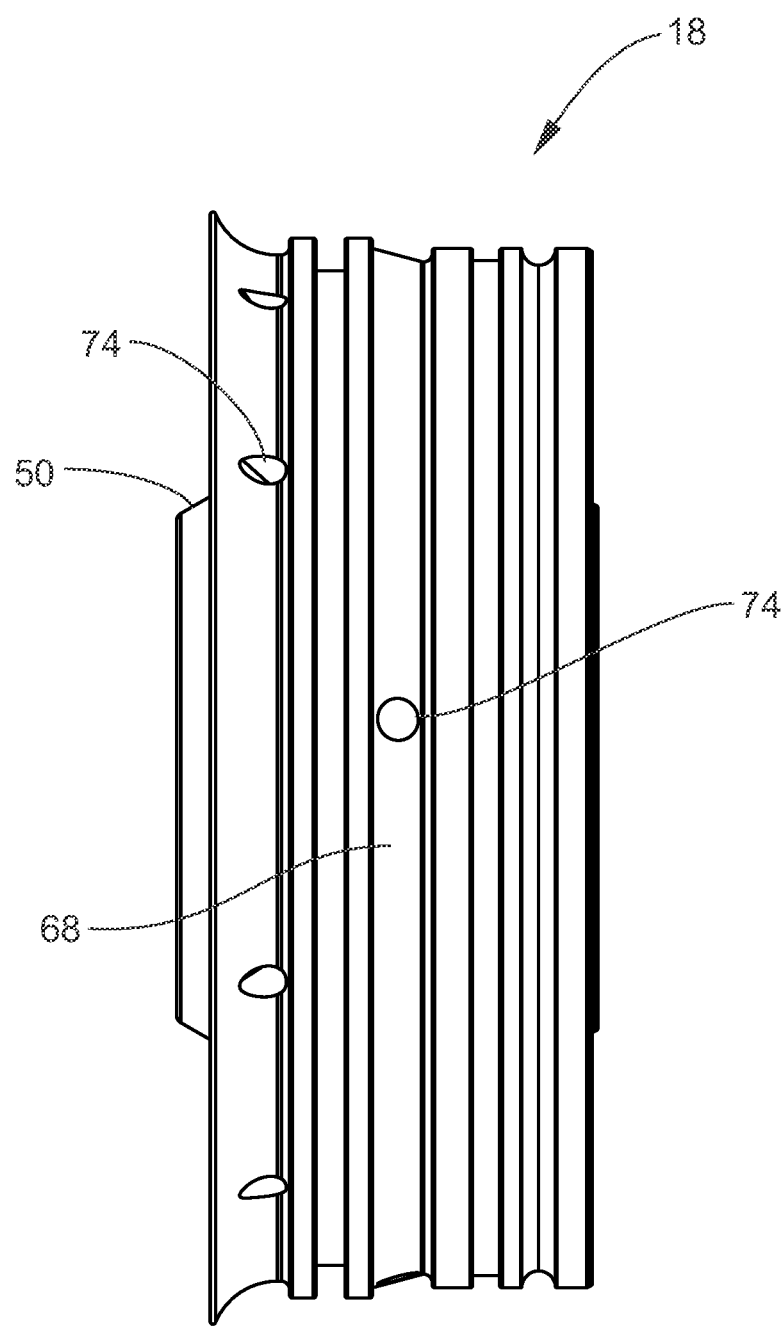
FIG. 12 is a side view of the central hub.
Figure 13:
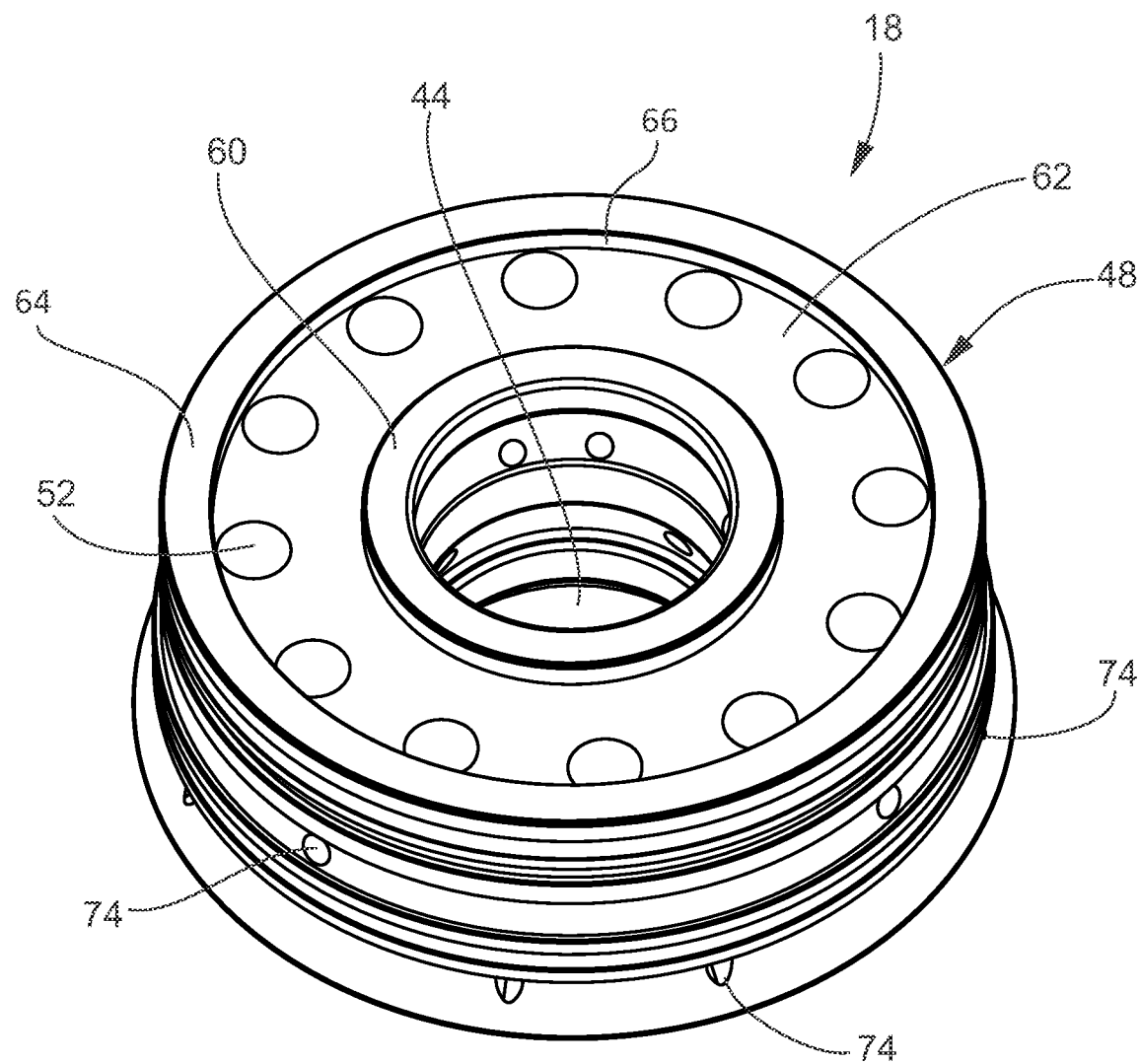
FIG. 13 is a perspective view of the central hub.
Figure 14:
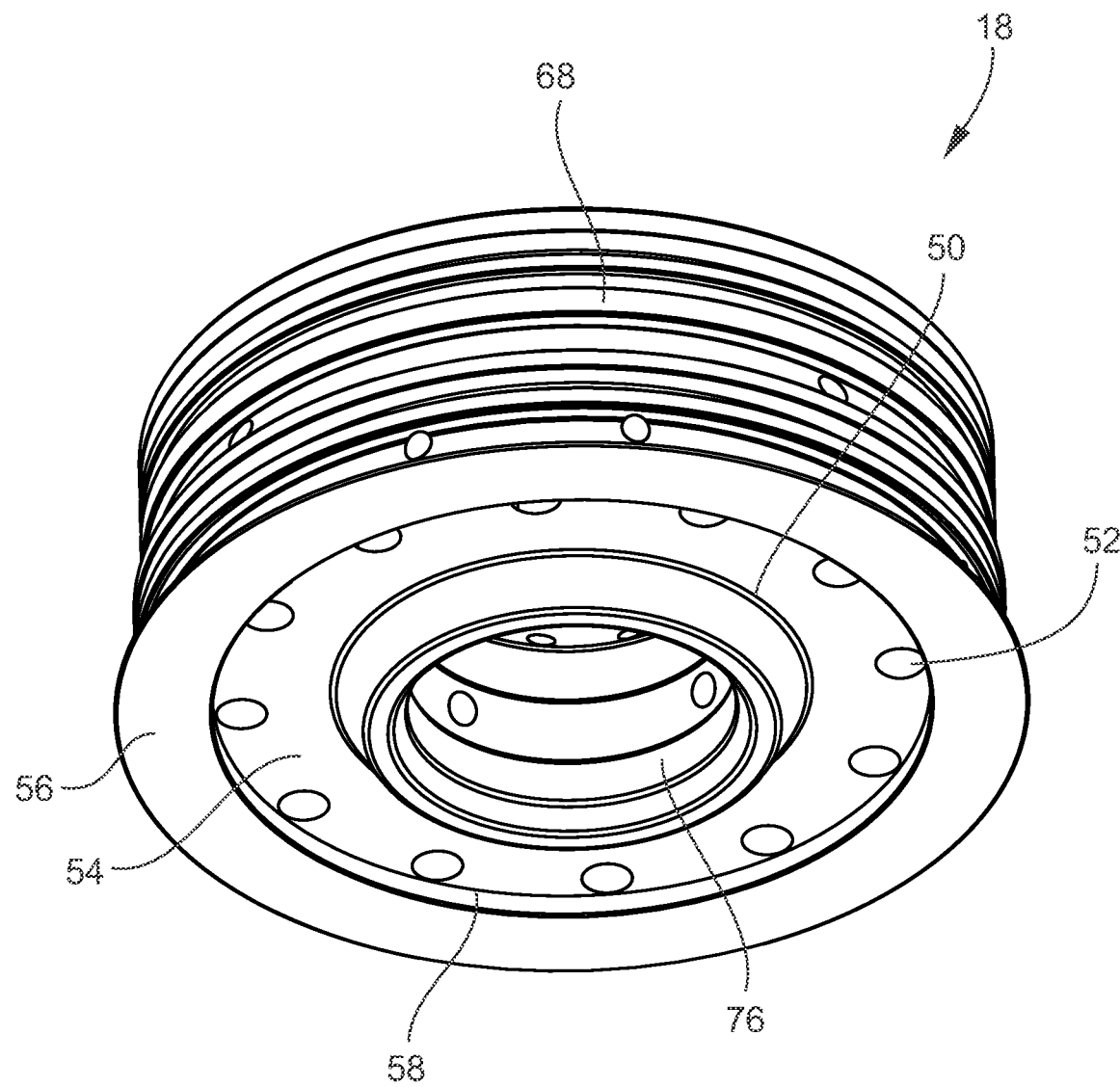
FIG. 14 is a perspective view of the central hub.

The central hub 18 is illustrated by itself in FIGS. 10-14. The central hub 18 has a circular cross-section with a central opening 44 with a first end 46 and a second end 48. The central hub 18 is engaged to the top surface of the plate 12. The first end 46, as best shown in FIGS. 11 and 14, contains a partially conical ring 50 surrounding the central opening 44, extending longitudinally outwardly from the surface of the first end 46. A plurality of spaced apart receiving bores 52, extending from the first end 46 to the second end 48 are disposed within the central hub 18. The receiving bores 52 are preferably spaced an equal distance apart from each other within the central hub 18 and having a circular arrangement when the first end 46 and the second end 48 are viewed from above, as shown in FIGS. 10 and 11. The first end 46 includes an annular recessed portion 54, proximate the conical ring 50 and an outer engaging surface 56, forming a shoulder 58 between the annular recessed portion 54 and the outer engaging surface 56.

The second end 48, as best shown in FIGS. 10 and 13, contains a circular ring 60 surrounding the central opening 44, extending longitudinally outwards from the surface of the second end 48. The second end 48 contains an annular recessed portion 62 proximate the circular ring 60 and an outer engaging surface 64, forming a shoulder 66 between the annular recessed portion 62 and the outer engaging surface 64. The corresponding opening to the receiving bores 52 as shown in FIGS. 10 and 11 on the first end 46 are shown in FIGS. 10 and 13 on the second end 48 and positioned within the annular recessed portion 62. The receiving bores 52 are preferably spaced an equal distance apart from each other having a circular arrangement when the second end 48 is viewed from above.

The central hub 18 contains a side portion 68, as best shown in FIG. 12. The side portion 68 contains annular channels 70. The central hub 18 is a separate component that is secured to the plate 12, as illustrated in FIGS. 1 and 2, providing a two-piece clutch hub 10. The plate 12 and annular ring portion 16 are preferably composed of steel, while the central hub 18 is preferably composed of Aluminum. The splines 22 on the annular ring portion 16 are preferably composed of heat treated steel for preventing damage or unnecessary wear and tear and premature failure, during use. However, the plate 12 and central hub 18 may be composed of any material desired by the user.

Figure 17:
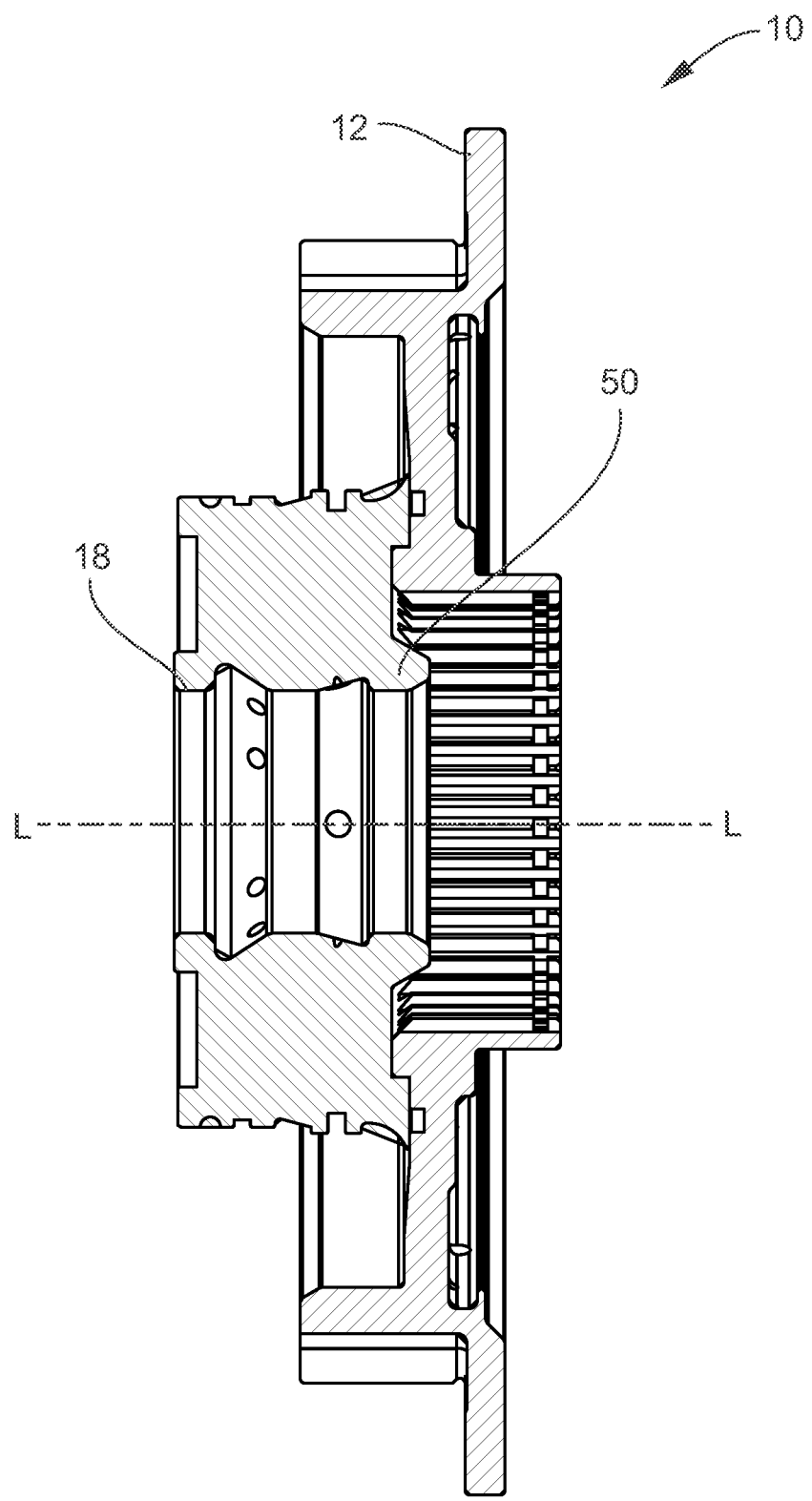
FIG. 17 is a cut-away view of the central hub.
Figure 18:
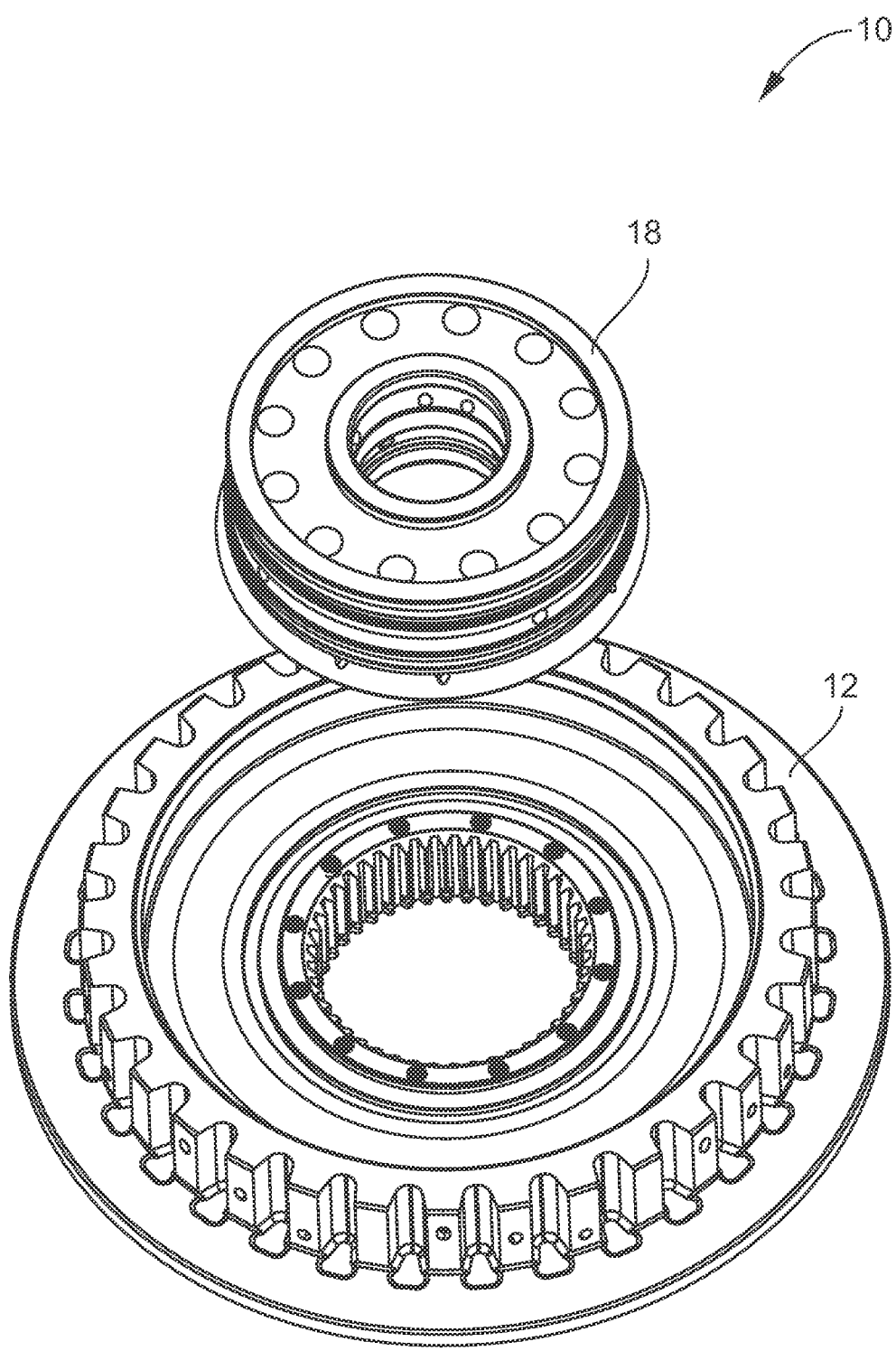
FIG. 18 is an exploded view of the clutch hub.
Figure 19:
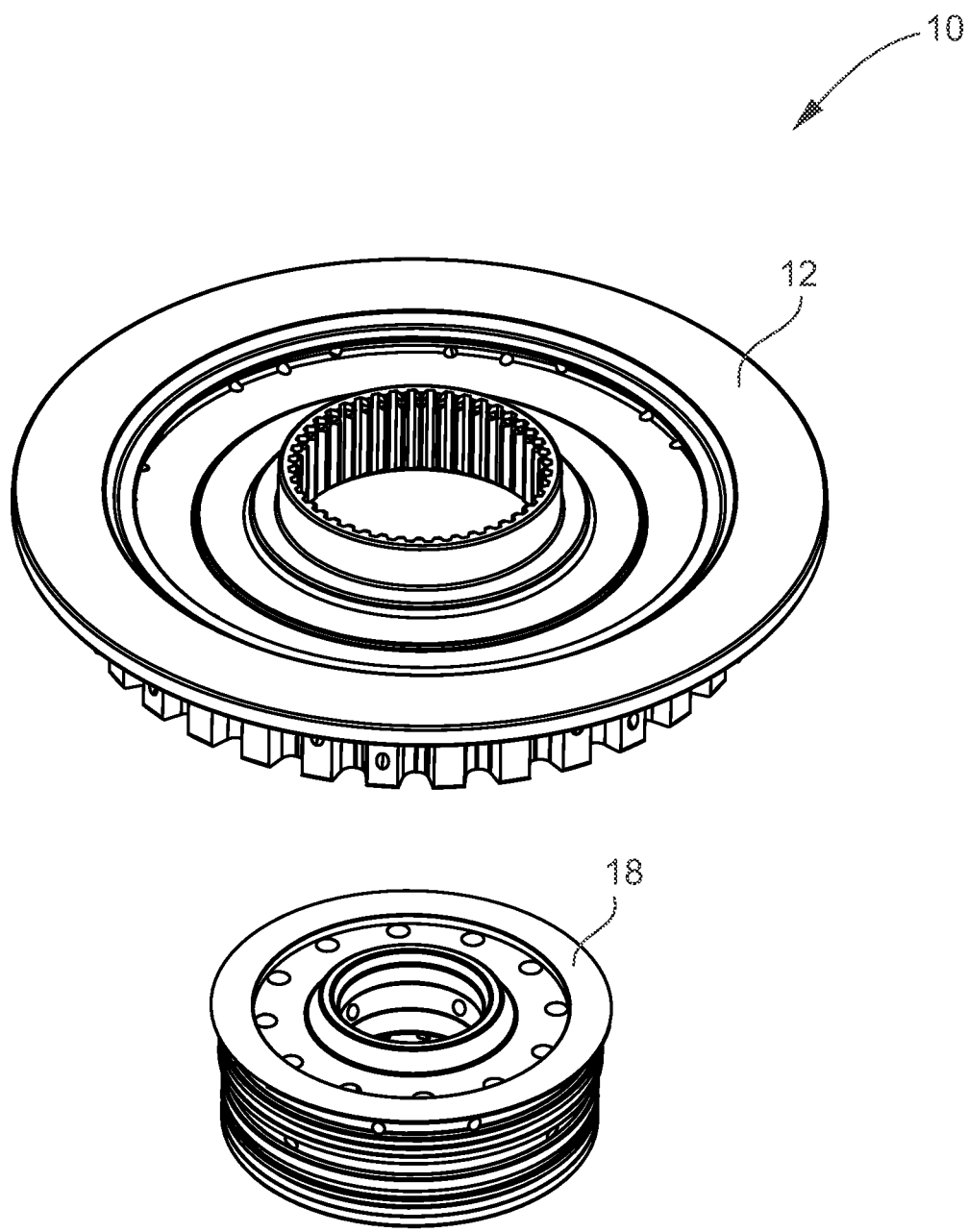
FIG. 19 is another exploded view of the clutch hub.

The first end 46 of the central hub 18 is placed adjacent the top surface of the plate 12. Specifically, the ring 50 on the first end 46 of the central hub 18 is positioned within the opening 14 of the plate 12, proximate the inner edge, and the receiving bores 52 of the central hub 18 are placed in a corresponding relationship with the receiving holes 32 of the collar 38, or in other words, the receiving bores 52 of the central hub 18 are placed overtop the receiving holes 32 of the collar 38, for receiving an engagement device, such as a bolt, screw, or the like for engaging the central hub 18 to the plate 12. FIGS. 2, 3, 4, and 17 illustrate the central hub 18 engaged to the plate 12. FIGS. 18 and 19 illustrate an exploded view showing the plate 12 and central hub 18 separated.

An o-ring (not shown) may be positioned between the central hub 18 and the top surface of the plate 12 to prevent any leakage of fluid. The o-ring is preferably positioned within the circular channel 36. When the central hub 18 is engaged to the plate 12, the o-ring deforms and creates a liquid tight seal between the central hub 18 and plate 12, preventing a liquid, such as oil, from proceeding past the o-ring and contacting other portions of the plate 12, annular ring portion 16, and components engaged to the clutch hub 10. As best shown in FIG. 17, when the central hub 18 is engaged to the plate 12, the outer engaging surface 56 of the first end 46 is disposed over the circular channel 36 of the plate 12, covering the entire circular channel 36, and the outer portion of the outer engaging surface 56 contacts a portion of the plate 12 proximate the circular channel 36.

Figure 15:
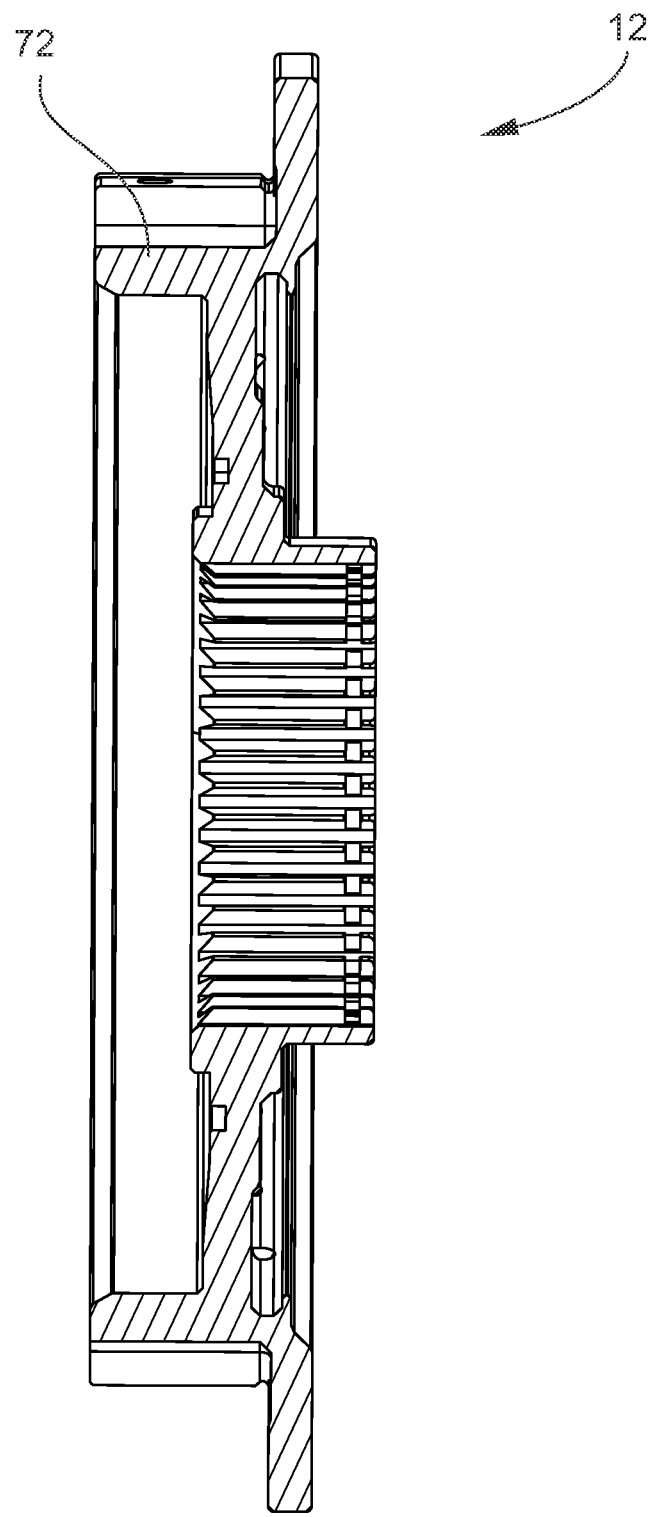
FIG. 15 is a cut-away view of the plate.

A spline passageway 72 may be disposed within a spline 22 on the annular ring portion 16. As illustrated in FIG. 15, the spline passageway 72 contains an opening within the outer surface of the spline 22 and an opening within the bottom surface of the plate 12 with a hollow, generally circular passageway extending between the openings for allowing a liquid, such as oil, to flow through the spline passageway 72. As illustrated in FIG. 2, not every spline 22 contains a spline passageway 72. The opening to the spline passageway 72 is disposed within the outer surface of the spline 22, extending through the interior of the spline 22 and the annular ring portion 16, as shown in FIG. 15, to the opposite opening disposed on the bottom surface of the plate 12. The opening within the bottom surface of the plate 12 is preferably proximate the shoulder 42, as shown in FIG. 1.

As illustrated in FIG. 2, a spline passageway 72 is disposed within three adjacent splines 22, referred to herein as a group of three, and the splines 22 adjacent this group of three adjacent splines 22 does not contain a spline passageway 72. Every spline 22 of the annular ring portion 16 of the clutch hub 10 does not contain a spline passageway 72, as illustrated. However, the spline passageway 72 may be contained within every spline 22 or a select number of splines 22 depending upon the intended use of the clutch hub 10 and/or desires of the user. As illustrated in FIG. 2, the opening to the spline passageway 72 may be located at points along the spline 22 that differ between the adjacent splines 22 and splines 22 within the group of three. As best shown in FIG. 2, the group of three adjacent splines 22 containing a spline passageway 72 contain an opening positioned at different distances from the top surface of the plate 12 or from the upper edge of the annular ring portion 16 than the other splines 22 within the group of three.

As illustrated, the spline passageway 72 within the first spline 22 in the group of three, moving in the clockwise direction around the annular ring portion 16, is located in closer proximity to the bottom surface of the plate 12 and a further distance from the upper edge of the annular ring portion 16 than the openings on the other two splines 22 within the group of three. The second spline 22, in the group of three, contains an opening within the outer surface of the spline 22 that is a greater distance from the bottom surface of the plate 12 and less distance from the upper edge of the annular ring portion 16 than the first spline 22 in the group of three. The final spline 22, in the group of three, contains an opening within the outer surface of the spline 22 that is a greater distance from the bottom surface of the plate 12 and less distance from the upper edge of the annular ring portion 16 than the first spline 22 and the second spline 22 in the group of three. Each group of three splines 22 containing a spline passageway 72 is separated by a spline 22 that does not contain a spline passageway 72.

As shown in FIG. 1, the opposed opening of each spline passageway 72 is disposed proximate the shoulder 42 on the bottom surface of the plate 12. These openings to the spline passageway may be positioned at different locations on the bottom surface of the plate 12 and proximate the shoulder 42. These opening may be disposed within the shoulder 42, at the intersection of the shoulder 42 and the annular depression 40 on the bottom surface of the plate 12, and/or within the annular depression 40 within the bottom surface of the plate 12. These openings may be also arranged in groups of three, wherein a group of three openings to spline passageways 72 are spaced an equal distance apart from each other and groups of three openings are disposed around the bottom surface of the plate 12. As illustrated in FIG. 1, the distance between each group of three openings within the bottom surface of the plate 12 is greater than the distance between each opening within the group of three. The spline passageways 72 allow a liquid, such as oil, to flow into the opening on the outer surface of the spline 22, through the passageway, and exit the opening within the bottom surface of the plate 12, allowing oil to flow from an area external the clutch hub 10 to the interior of the clutch hub 10. The spline passageways 72 are angled downward from the opening within the outer surface of the spline 22 to the opening within the bottom surface of the plate 12.

Figure 16:
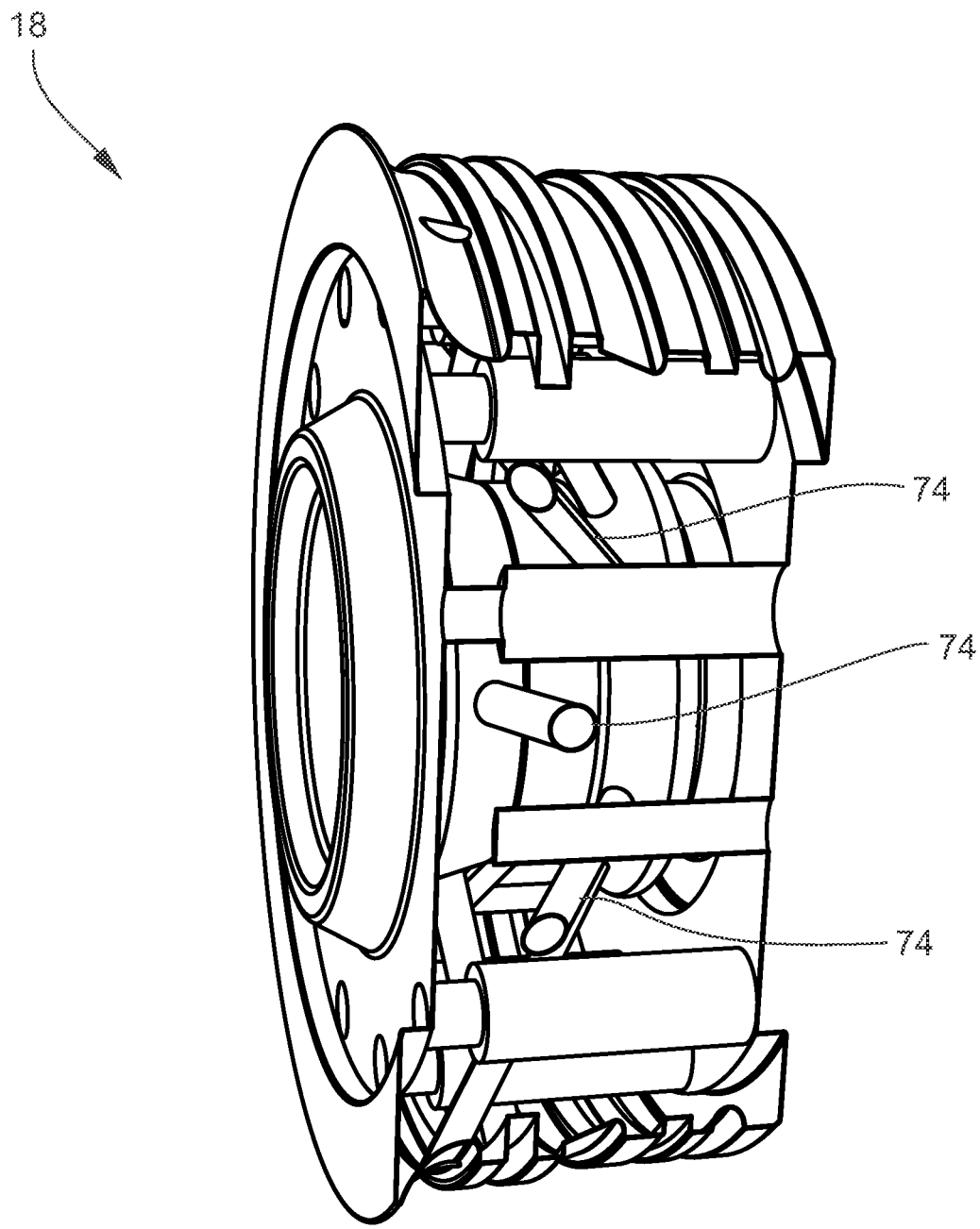
FIG. 16 is a partial cut-away view of the central hub.

The central hub 18 contains central hub passageways 74, as illustrated in FIG. 16. The central hub passageways 74 contain an opening within the outer side portion 68 of the central hub 18 and an opposed opening within the inner side portion 76 of the central hub 18 and a passageway extending between the openings. The central hub passageways 74 are hollow and generally circular for allowing fluid to enter an opening, flow through the passageway, and exit the opposed opening. As best shown in FIG. 12, openings of the central hub passageways 74 are within the outer side portion 68 and preferably proximate the first end 46. Some openings of the central hub passageways 74 are centrally located within the outer side portion 68. The central hub passageways 74 containing an opening proximate the first end 46 contain an opposed opening located a greater distance from the first end 46 within the inner side portion 76 that the opening within the outer side portion 68, resulting in an angled central hub passageway 74. The central hub passageways 74 with openings centrally located within the outer side portion 68 contain an opposed opening centrally located within the inner side portion 76, resulting in a central hub passageway 74 that is not angled and extends radially from the inner side portion 76 to the outer side portion 68 of the central hub 18. The central hub passageways 74 allow a liquid, such as oil, to enter an opening, proceed through the passageway, and exit the opposed opening, allowing oil to flow from an area external to the clutch hub 10 to an interior portion of the clutch hub 10, such as within the central opening 44 of the central hub 18.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. A clutch hub, comprising:
   a plate with a top surface and a bottom surface that extends outward to an outer edge;
   an annular ring portion with an exterior surface, the annular ring portion extends from the top surface of the plate at a distance from the outer edge and forming an outer flange between the exterior surface and the outer edge;

a plurality of splines disposed on the exterior surface of the annular ring portion;

at least one spline passageway extending between an outer surface of a spline to the bottom surface of the plate; and a central hub.

2. The clutch hub according to claim 1, wherein the central hub is centrally disposed and removably engaged to the plate.

3. The clutch hub according to claim 1, wherein the central hub is composed of aluminum.

4. The clutch hub according to claim 1, wherein the plate, annular ring, and splines are composed of steel.

5. The clutch hub according to claim 1, wherein the central hub has a circular cross-section and a first end, a second end, an outer side portion extending between the first end and the second end, and a centrally located opening defined by an inner side portion.

6. The clutch hub according to claim 5, further comprising at least one opening in the outer side portion of the central hub and at least one opposed opening in the inner side portion of the central hub and a central hub passageway extending between the opening in the outer side portion and the inner side portion.

7. The clutch hub according to claim 5, wherein the plate contains a centrally disposed opening extending along the longitudinal axis of the clutch hub, the central hub contains a ring, extending outwardly from the first end of the central hub that is positioned within the opening of the plate.

8. The clutch hub according to claim 5, further comprising a plurality of openings in the outer side portion of the central hub and a plurality of openings in the inner side portion of the central hub and a plurality of central hub passageways extending between the openings in the outer side portion and the openings in the inner side portion.

9. A clutch hub, comprising:

a plate circular in shape with a top surface and a bottom surface containing an outer edge and a centrally disposed opening extending along the longitudinal axis of the clutch hub between the top surface to the bottom surface of the plate defined by an inner edge;

an annular ring portion with a circular cross-section extends from the top surface of the plate, the annular ring portion contains a front surface and a back surface;

a plurality of splines extending radially outward from the back surface of the annular ring portion;

a central hub engaged to the plate, the central hub has a circular cross-section and a first end, a second end, an outer side portion extending between the first end and the second end, and a centrally located opening defined by an inner side portion; and' at least one central hub passageway extending between at least one opening within the outer side portion of the central hub and at least one opening within the inner side portion of the central hub.

10. The clutch hub according to claim 9, wherein the central hub is composed of aluminum.

11. The clutch hub according to claim 9, wherein the plate, annular ring, and splines are composed of steel.

12. The clutch hub according to claim 9, wherein the central hub is composed of aluminum and the splines are composed of heat treated steel.

13. The clutch hub according to claim 9, further comprising at least one spline passageway extending between an outer surface of a spline to the bottom surface of the plate.

14. The clutch hub according to claim 9, further comprising a plurality of spline passageways extending between an outer surface of a spline to the bottom surface of the plate.

15. A clutch hub, comprising:

a plate circular in shape with a top surface and a bottom surface containing an outer edge and a centrally disposed opening extending along the longitudinal axis of the clutch hub between the top surface to the bottom surface of the plate defined by an inner edge;

an annular ring portion with a circular cross-section extends from the top surface of the plate, the annular ring portion contains a front surface and a back surface;

a plurality of splines extending radially outward from the back surface of the annular ring portion;

a plurality of spline passageways extending between an outer surface of the splines to the bottom surface of the plate;

a central hub engaged to the plate, the central hub has a circular cross-section and a first end, a second end, an outer side portion extending between the first end and the second end, and a centrally located opening defined by an inner side portion; and' at least one central hub passageway extending between at least one opening within the outer side portion of the central hub and at least one opening within the inner side portion of the central hub.

16. The clutch hub according to claim 15, wherein the central hub is composed of aluminum and the plate is composed of steel.

17. The clutch hub according to claim 15, wherein the central hub is composed of aluminum and the splines are composed of heat treated steel.

18. The clutch hub according to claim 15, wherein the plate contains a centrally disposed opening extending along the longitudinal axis of the clutch hub, the central hub contains a ring, extending outwardly from the first end of the central hub that is positioned within the opening of the plate.

19. The clutch hub according to claim 15, further comprising a plurality of openings in the outer side portion of the central hub and a plurality of openings in the inner side portion of the central hub and a plurality of central hub passageways extending between the openings in the outer side portion and the openings in the inner side portion.

20. The clutch hub according to claim 15, wherein the central hub contains a ring, extending outwardly from the first end of the central hub that is positioned within the opening of the plate.

* * * * *